US009692606B2

(12) United States Patent
Rasanen

(10) Patent No.: US 9,692,606 B2
(45) Date of Patent: Jun. 27, 2017

(54) MANAGEMENT OF A POLICY CONTROLLED GROUP

(71) Applicant: NOKIA SOLUTIONS AND NETWORKS OY, Espoo (FI)

(72) Inventor: Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 141 days.

(21) Appl. No.: 14/439,489

(22) PCT Filed: Oct. 31, 2012

(86) PCT No.: PCT/EP2012/071562
§ 371 (c)(1),
(2) Date: Apr. 29, 2015

(87) PCT Pub. No.: WO2014/067568
PCT Pub. Date: May 8, 2014

(65) Prior Publication Data
US 2015/0295724 A1    Oct. 15, 2015

(51) Int. Cl.
H04B 1/56      (2006.01)
H04L 12/50    (2006.01)
(Continued)

(52) U.S. Cl.
CPC ...... H04L 12/1407 (2013.01); H04L 41/0893 (2013.01); H04L 43/16 (2013.01);
(Continued)

(58) Field of Classification Search
CPC .................. H04L 12/1407; H04L 12/2403
See application file for complete search history.

(56) References Cited

U.S. PATENT DOCUMENTS 6,963,573 B1 * 11/2005 Cain ..................... H04L 12/185
370/393
2010/0010922 A1 * 1/2010 Foottit .................. G06Q 10/00
705/30
(Continued)

FOREIGN PATENT DOCUMENTS

WO    WO 2010/086013 A1    8/2010
WO    WO 2011/006889 A1    1/2011

OTHER PUBLICATIONS

3GPP TS 22.468 V0.1.0 (Aug. 2012) Technical Specification 3rd Generation Partnership Project; Technical Specification Group Services and System Aspects; Group Communication System Enablers for LTE; (GCSE_LTE) Release 12.
3GPP TR 23.858 V1.0.0 (Nov. 2012) Technical Report 3rd Generation Partnership Project; Technical Specification Group Services and System Aspects; Usage Monitoring Control PCC Enhancement; (Release 12).
(Continued)

*Primary Examiner* — Faruk Hamza
*Assistant Examiner* — Abu-Sayeed Haque
(74) *Attorney, Agent, or Firm* — Squire Patton Boggs (US) LLP

(57) ABSTRACT

There are provided measures for handling policy controlled groups. Exemplarily, such measures comprise receiving, in a first rules function, a notification informing that a user equipment is to be included in a policy controlled group, checking whether the policy controlled group is controlled by the first rules function, and, in case the policy controlled group is not controlled by the first rules function, causing a transfer of the policy control session for the user equipment to a second rules function controlling the policy controlled group.

31 Claims, 3 Drawing Sheets

(51) Int. Cl.
*H04L 12/28* (2006.01)
*H04L 12/14* (2006.01)
*H04L 12/26* (2006.01)
*H04L 12/24* (2006.01)
*H04L 12/813* (2013.01)
*H04W 28/10* (2009.01)
*H04M 15/00* (2006.01)

(52) U.S. Cl.
CPC ............ *H04L 47/20* (2013.01); *H04W 28/10* (2013.01); *H04M 15/8016* (2013.01)

(56) References Cited

U.S. PATENT DOCUMENTS

| | | | | |
|---|---|---|---|---|
| 2010/0316063 | A1* | 12/2010 | Zhou | H04L 12/5695 370/431 |
| 2011/0296032 | A1* | 12/2011 | Pastor Balbas | H04L 12/5695 709/227 |
| 2012/0023554 | A1* | 1/2012 | Murgia | H04L 63/102 726/4 |
| 2012/0269061 | A1* | 10/2012 | Kekki | H04W 28/24 370/230 |
| 2012/0287854 | A1* | 11/2012 | Xie | H04W 4/005 370/328 |
| 2012/0307798 | A1* | 12/2012 | Zhou | H04W 4/00 370/331 |
| 2013/0012204 | A1* | 1/2013 | Kim | H04W 60/06 455/435.1 |
| 2014/0192754 | A1* | 7/2014 | Perez Martinez | H04L 67/02 370/329 |
| 2015/0236891 | A1* | 8/2015 | Rasanen | H04L 67/141 709/223 |

OTHER PUBLICATIONS

3GPP TSG-SA WG1 #59 S1-122127 Chicago, USA, Jul. 30-Aug. 3, 2012; Proposed text to section 4.2 'Group Handling' of 22.468; Source: Nokia Siemens Networks.
3GPP TSG-SA WG1 #59 S1-122124 Chicago, USA, Jul. 30-Aug. 3, 2012; GCSE 22.468 Skeleton; Source: Nokia Siemens Networks.
3GPP TSG-SA WG1 #59 S1-122125; Chicago, USA, Jul. 30-Aug. 3, 2012; General Considerations on GCSE_LTE work; Source: Nokia Siemens Networks.
3GPP TSG-SA WG1 #59 S1-122126; Chicago, USA, Jul. 30-Aug. 3, 2012; Proposed text to sections 3.1 'Definitions' and 4.1 'High Level Requirements' of 22.468; Source: Nokia Siemens Networks.
3GPP TSG-SA WG1 #59 S1-122128 Chicago, USA, Jul. 30-Aug. 3, 2012; Proposed text for section 4.3 'Using Groups' of 22.468; Source: Nokia Siemens Networks.
3GPP TSG-SA WG1 #59 S1-122129; Chicago, USA, Jul. 30-Aug. 3, 2012; Proposed text for section 5 'Interaction with other Services and Functions' of 22.468 Source: Nokia Siemens Networks.
3GPP TS 23.203 V11.6.0 (Jun. 2012) Technical Specification 3rd Generation Partnership Project; Technical Specification Group Services and System Aspects; Policy and charging control architecture (Release 11).
3GPP TS 29.212 V11.5.0 (Jun. 2012) Technical Specification 3rd Generation Partnership Project; Technical Specification Group Core Network and Terminals; Policy and Charging Control (PCC) over Gx/Sd reference point (Release 11).
3GPP TS 29.215 V11.6.0 (Sep. 2012) Technical Specification 3rd Generation Partnership Project; Technical Specification Group Core Network and Terminals; Policy and Charging Control (PCC) over S9 reference point; Stage 3 (Release 11).
International Search Report dated Jul. 11, 2013 corresponding to International Patent Application No. PCT/EP2012/071562.

* cited by examiner

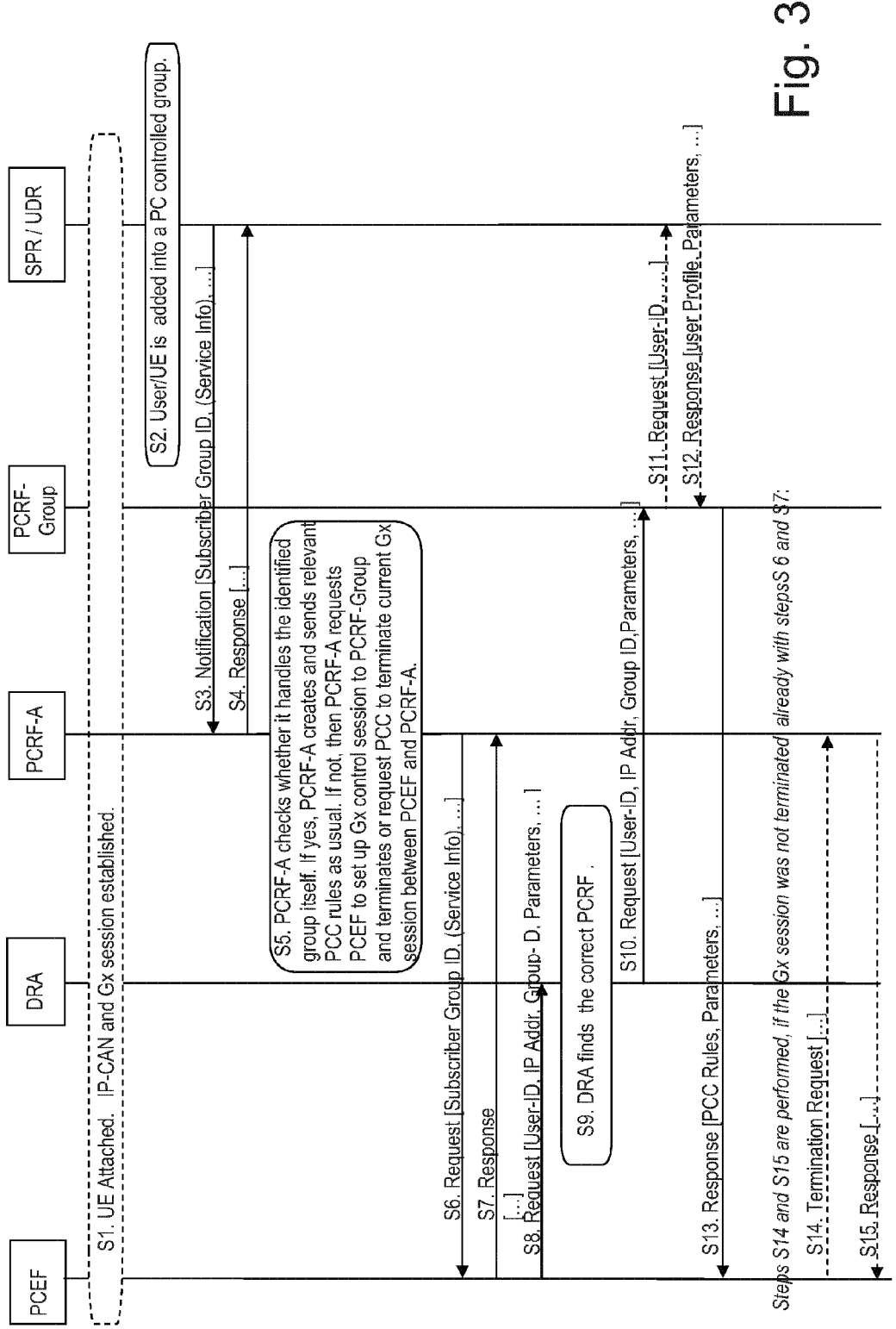

MANAGEMENT OF A POLICY CONTROLLED GROUP

FIELD OF THE INVENTION

The present invention relates to an apparatus, a method and a computer program product for providing a management of a policy controlled group.

RELATED BACKGROUND ART

The following meanings for the abbreviations used in this specification apply:
3GPP 3rd generation partnership project
AF application function
BBERF bearer binding and event reporting function
CAN connectivity access network
DRA diameter routing agent
EPC evolved packet core
E-UTRAN evolved universal terrestrial radio access network
GCSEL group communication system enablers for LTE
GW gateway
ID identity, identifier
IMSI international mobile subscriber identity
IP internet protocol
LTE long term evolution
OCS online charging system
OFCS offline charging system
NPSTC national public safety telecommunications council
PCC policy and charging control
PCEF policy and charging enforcement function
PCRF policy and charging rules function
PDN packet data network
P-GW packet data network gateway
QoS quality of service
SPR subscription profile repository
TDF traffic detection function
TR technical report
UDR user data repository
UE user equipment Some embodiments of the present invention relate to usage monitoring. Usage monitoring can be applied to an accumulated usage of network resources on a per IP-CAN session and user basis. This capability is required for enforcing dynamic policy decisions based on the total network usage in real-time.

A PCRF that uses usage monitoring for making dynamic policy decisions sets and sends applicable thresholds to a PCEF or TDF for monitoring. The usage monitoring thresholds may be based e.g. on volume or actively used time. The PCEF or TDF notifies the PCRF when a threshold is reached and reports the accumulated usage since the last report for usage monitoring.

The usage monitoring capability can be applied to an individual service data flow, a group of services data flows, or to all traffic of an IP-CAN session in the PCEF. Usage monitoring, if activated, is performed both for service data flows associated with predefined PCC rules and dynamic PCC rules, including rules with deferred activation and/or deactivation times while those rules are active.

A usage monitoring group, when only a single user/UE is connected, is a set of service data flow(s)/application(s) of a user/UE that share a common traffic usage allowance and need to be monitored together for usage monitoring control purposes. Within a wider concept addressed in this application, a usage monitoring group comprises service data flows/applications of several users/UEs that share a common traffic usage allowance and need to be monitored together for usage monitoring control purposes.

The present application is not only directed to usage monitoring groups, but also other kinds of policy controlled groups. For example, 3GPP SA21 has a Rel-12 work item on Group Communication System Enablers for LTE (GCSEL), refer to the draft 3GPP TS 22.468. The scope of the WI reads as follows:

The present document collects the requirements as relevant to improve the EPC and E-UTRAN for system enablers to the 3GPP system to support group communication over LTE for Public Safety. The application layer making use of the group communication service enablers specified below is out of scope of this work. The US requirements as specified in NPSTC (Mission Critical Voice Requirements) are taken as starting point. Other regional requirements may also be reflected in the work. The requirements shall be worded in a way to easily accommodate future requirements from other regions or stakeholders.

Among other things, the following requirements should be fulfilled (e.g., 3GPP document S1-122127):

The group coordinator can add and delete group members. UEs shall be notified of being added to or deleted from a group.

The group-coordinator may link together two or more groups temporarily.

Linking shall immediately take effect. Alternatively the group coordinator shall be able to request linking to take place on idle groups, i.e. on groups where no UE is transmitting. Groups that are active, i.e. in which the floor is taken, while the linkage was initiated shall be linked to the already linked groups once they become idle.

UEs being members of the linked groups shall receive a notification of which groups have been linked together.

3GPP SA2 has also a Rel-12 study on Usage Monitoring Control PCC Enhancements, refer to the prior art draft TR 23.858. One of the key issues of this study is Usage Monitoring for Subscriber Group.

Handling of subscriber groups may involve problems, as will be described in the following.

Mobile networks typically apply the "always-on" principle, i.e. when a UE is switched on, it attaches a mobile network and establishes a default context/bearer with the network. And if policy and charging control (PCC) is deployed in the network, the network allocates a policy and charging control function (PCRF) for the UE and its network context. This relationship is maintained as long as the UE is connected to the network.

A major problem with this is that if the user/UE is included/added in a policy and/or charging controlled group while already being attached to the network, the UE and the rest of the group members may be served by different PCRFs, selected upon IP-CAN session establishment. Handling of common/group related policy and/or charging control activities, e.g. monitoring of the usage of common quota, would be impossible or very complicated with several PCRFs involved in the process.

The problem is acute within the Group Communication System Enablers for LTE (GCSEL) work item even without an "always-on" principle, because it quite obviously does not make sense that possible to-be-joined-into-a-public-safety-group subscribers were not online/connected and because the joined-in subscribers shall be notified of being added to the group.

SUMMARY OF THE INVENTION

Embodiments of the present invention address this situation and aim to overcome the above-described problems and to provide a reliable management of policy controlled groups.

According to a first aspect of the present invention an apparatus is provided which comprises a connection unit configured to provide a connection to a communication network, and a processor configured to receive a notification informing that a user equipment is to be included in a policy controlled group via the connection unit, to check whether the policy controlled group is controlled by the apparatus, and, in case the policy controlled group is not controlled by the apparatus, to cause a transfer of the policy control session for the user equipment to a rules function controlling the policy controlled group.

According to a second aspect of the present invention an apparatus is provided which comprises a connection unit configured to provide a connection to a communication network, and a processor configured to receive a request from a first rules function including information that a user equipment is to be included in a policy controlled group which is not controlled by the first rules function, and to cause a determination of a second rules function which controls the policy controlled group.

According to a third aspect of the present invention an apparatus is provided which comprises a connection unit configured to provide a connection to a communication network, and a processor configured to receive a request from an enforcement function including information that a user equipment attached to a first rules function is to be included in a policy controlled group which is not controlled by the first rules function, and to determine a second rules function which controls the policy controlled group.

According to a fourth aspect of the present invention, a method is provided which comprises
- receiving a notification, in a first rules function, informing that a user equipment is to be included in a policy controlled group,
- checking whether the policy controlled group is controlled by the first rules function, and,
- in case the policy controlled group is not controlled by the first rules function, causing a transfer of the policy control session for the user equipment to a second rules function controlling the policy controlled group.

According to a fifth aspect of the present invention, a method is provided which comprises
- receiving a request from a first rules function including information that a user equipment is to be included in a policy controlled group which is not controlled by the first rules function, and
- causing a determination of a second rules function which controls the policy controlled group.

According to a sixth aspect of the present invention, a method is provided which comprises
- receiving a request from an enforcement function including information that a user equipment attached to a first rules function is to be included in a policy controlled group which is not controlled by the first rules function, and
- determining a second rules function which controls the policy controlled group.

Modifications of the above aspects are defined in the dependent claims.

According to a seventh aspect of the present invention, a computer program product is provided which comprises code means for performing a method according to any one of the fourth to sixth aspects and/or their modifications, when run on a processing means or module. The computer program product may be embodied on a computer-readable medium, for example.

Thus, according to embodiments of the present invention, handling/serving of a user equipment wishing to join a policy controlled group which is not handled by a certain rules function can be transferred to a rules function which also controls the policy controlled group. Thus, since the policy controlled group and the user equipment can be handled/served by the same rules function, a reliable management of policy controlled groups can be achieved.

BRIEF DESCRIPTION OF THE DRAWINGS

These and other objects, features, details and advantages will become more fully apparent from the following detailed description of embodiments of the present invention which is to be taken in conjunction with the appended drawings, in which:

FIG. 3 shows a signaling diagram illustrating a basic operation of a PCRF change caused by adding user/UE in a PC controlled group according to an embodiment of the present invention.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

However, before explaining embodiments of the present invention in detail, a logical architecture of a PCC functionality to which embodiments of the present invention may be applied is described by referring to FIG. 2. The PCC functionality is comprised by the functions of a PCEF (policy and charging enforcement function) included in a gateway node, a BBERF (bearer binding and event reporting function), a PCRF (policy and charging rules function), an AF (application function), a TDF (traffic detection function), an OCS (online charging system), an OFCS (offline charging system) and an SPR (subscription profile repository) or UDR (user data repository).

The PCEF is connected to the PCRF, the OCS and the OFCS via Gx, Gy and Gz interfaces, respectively.

The PCRF is connected to the BBERF, the AF, the TDF and the OCS via Gxx, Rx, Sd and Sy interfaces, respectively.

The SPR/UDR is applied to store PCC related subscription data. An Sp/Ud interface between PCRF and SPR/UDR is used to access subscription data in the SPR/UDR. The PCC architecture extends the architecture of an IP-CAN, where the PCEF is a functional entity in a gateway node implementing IP access to a PDN.

As mentioned above, in such a situation problems may occur when a UE served/handled by particular PCRF joins a policy controlled group (e.g., a usage monitoring group) which is served/handled by another PCRF. According to embodiments of the present invention, all UEs belonging to the same policy and charging controlled group, e.g. monitoring group, should preferably use the same PCRF.

Figure 1:
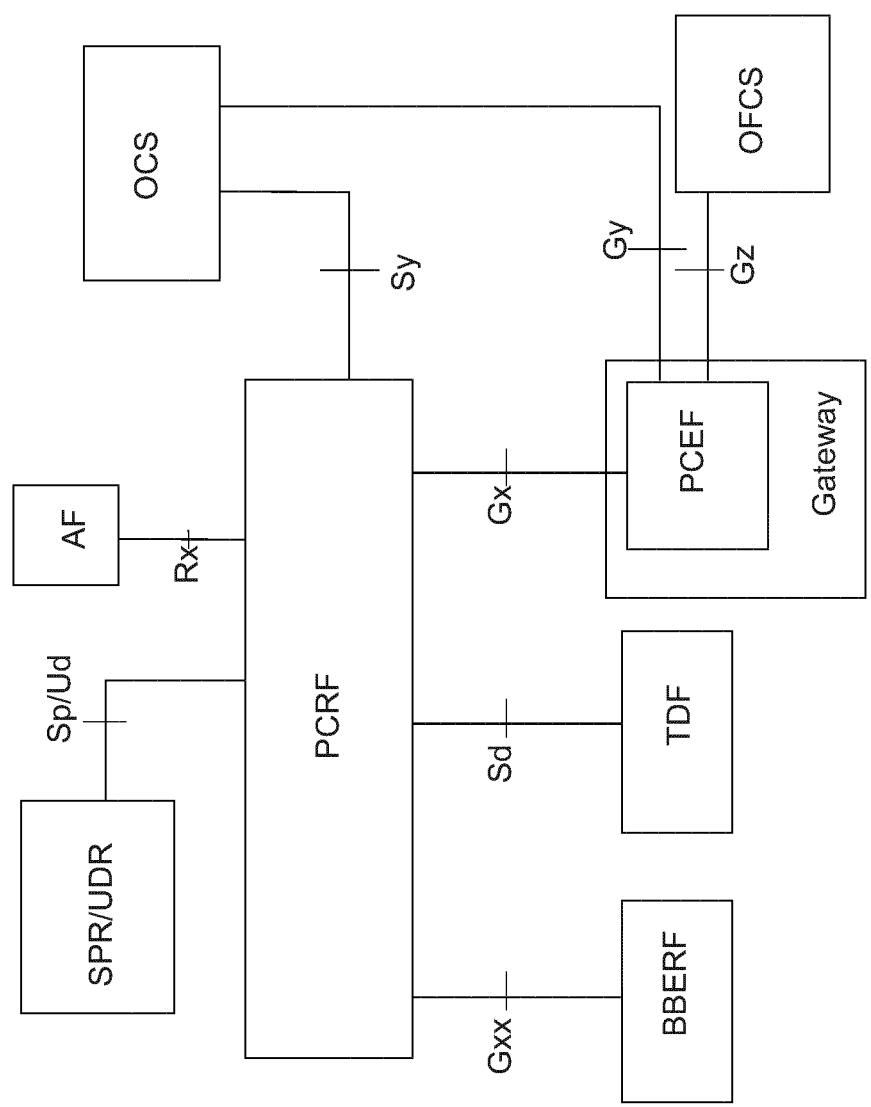
FIG. 1 shows a schematic block diagram illustrating an environment to which the present invention can be applied.

In the following, a general embodiment of the present invention is described by referring to FIG. 2 according to which the above measure can be achieved. It is noted that the elements described in the following may be applied to the architecture described above by referring to FIG. 1, but that the elements may also applied in other suitable architectures.

Figure 2A:
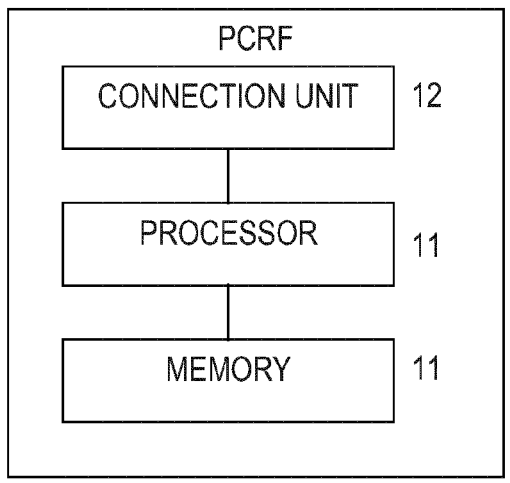
FIGS. 2A, 2B and 2C show a simplified structures of a PCRF, a PCEF and a DRA according embodiments of the present invention.

FIG. 2A shows a PCRF or a network element carrying out the corresponding function, as an example for a corresponding apparatus applying an embodiment of the present invention. The PCRF is only an example, and also other suitable network elements performing a rules function could be applied. For example, the PCRF may be implemented in a gateway node.

The PCRF 1 comprises a processor 11 and a connection unit 12. The connection unit 12 is configured to provide a connection to a communication network. The processor 11 is configured to receive a notification informing that a user equipment is to be included in a policy controlled group via the connection unit, to check whether the policy controlled group is controlled by the apparatus, and, in case the policy controlled group is not controlled by the apparatus, to cause a transfer of the policy control session for the user equipment to a rules function (e.g., another PCRF) controlling the policy controlled group.

In case the policy controlled group is controlled by the apparatus, no transfer is necessary and the user equipment will be controlled by the apparatus.

Figure 2B:
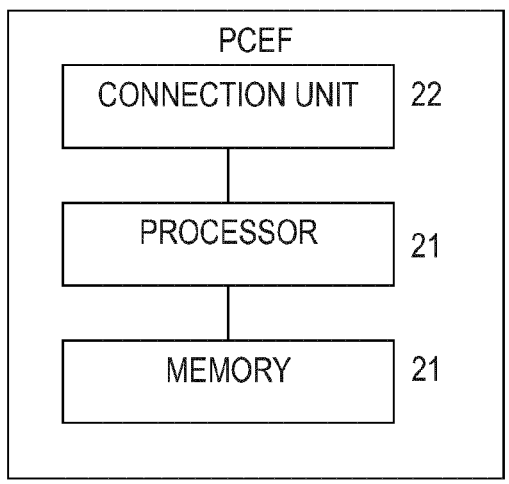

FIG. 2B shows a PCEF or a corresponding network element carrying out the function thereof, as an example for a corresponding apparatus applying an embodiment of the present invention. The PCEF is only an example, and also other suitable network elements performing an enforcement function could be applied.

The PCEF 2 comprises a processor 21 and a connection unit 22. The connection unit 22 is configured to provide a connection to a communication network. The processor 21 is configured to receive a request from a first rules function (e.g., the PCRF 1 handling/serving the user equipment) including information that a user equipment is to be included in a policy controlled group which is not controlled by the first rules function, and to cause a determination of a second rules function (e.g., a PCRF handling/serving the group) which controls the policy controlled group.

Figure 2C:
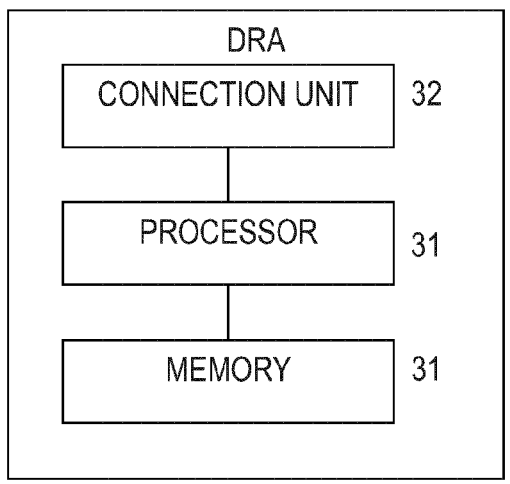

FIG. 2C shows a DRA or a corresponding network element carrying out a routing function thereof, as an example for a corresponding apparatus applying an embodiment of the present invention. The DRA is only an example, and also other suitable network elements performing a routing function could be applied.

The DRA 3 comprises a processor 31 and a connection unit 32. The connection unit 32 is configured to provide a connection to a communication network. The processor 31 is configured to receive a request from an enforcement function (e.g., the PCEF 2) including information that a user equipment attached to a first rules function is to be included in a policy controlled group which is not controlled by the first rules function, and to determine a second rules function which controls the policy controlled group.

Thus, the above-described elements perform procedures such that when a user equipment handled/served by a certain rules function (such as the PCRF 1) wishes to join a policy controlled group which is not handled by this certain rules function, the rules function determines that rules function handling/serving the group, namely by forwarding a corresponding request to an enforcement function (such as the PCEF 2). The enforcement function in turn causes a determination of the correct rules function (e.g., another PCRF) which handles/serves the group. For example, this can be effected by sending a corresponding request to the routing element (such as the DRA 3), which is able to determine the correct PCRF.

In this way, handling/serving of the user equipment can be transferred to the rules function (PCRF) which also controls the policy controlled group.

Optionally, the PCRF 1, the PCEF 2 and the DRA 3 may further comprise respectively memories 13, 23 and 33 for storing data and programs, by means of which the corresponding processors 11, 21 and 31 may carry out their corresponding functions.

In the following, a more detailed embodiment of the present invention is described. This embodiment is applied to the architecture as described above in connection with FIG. 1.

In particular, when a user/UE that is already attached to the network, is included/added in a policy controlled group, e.g. a Group Communication related group or a usage monitoring group, the group management entity, e.g. the subscription register (SPR/UDR) informs the PCRF of the UE about the event by sending a notification to the PCRF. The notification contains relevant group identification information, e.g. a Group ID, and may contain other group or service related information, e.g. policy and/or charging rules, or quotas or thresholds in case of a monitoring group.

The PCRF checks whether it itself handles/serves the group with the identification information sent by the group management entity/SPR/UDR. If not, the PCRF (PCRF-A) initiates a PCRF change procedure for the user/UE. It is to be noted that in the following the PCRF handling/serving the UE initially is referred to as PCRF-A, whereas the PCRF handling/serving the group is referred to as PCRF-Group. The change procedure comprises:

The PCRF-A requesting the PCEF (and BBERF, if applicable) to establish a Gx (and Gxx, if applicable) control session to the PCRF ("PCRF-Group") which currently controls/serves the policy control group matching the group identification (sent by the SPR/UDR).

Terminating the current Gx control session between the PCEF and PCRF-A (and Gxx session between BBERF and PCRF-A, if applicable). The termination of the Gx session between PCRF-A and PCEF (and of the Gxx session between PCRF-A and BBERF, if applicable) may be performed/commanded by the PCRF-A, in which case the termination command may contain the parameters (e.g. Group ID) needed for the establishment of the Gx (/Gxx) session towards the PCRF-Group, or the PCRF-A just sends a request (with parameters) to the PCEF (/BBERF) and lets the PCEF (/BBERF) terminate the Gx (/Gxx) session(s) when appropriate either before or after establishing the corresponding control session(s) to the PCRF-Group.

FIG. 3 describes the basic solution according to the present embodiment in form of a signalling scenario with the following steps:

S1: A UE has attached to the network. A related IP-CAN session, default context/bearer, and Gx control session between the PCEF and PCRF (PCRF-A) have been established.

S2: The user/UE is configured or added into a policy and charging controlled group, e.g. a usage monitoring group, in the subscription register (SPR/UDR).

S3: The SPR/UDR sends a notification to inform the PCRF-A about the inclusion of the user/UE into the policy and/or charging (PC) controlled group. The notification includes at least information to identify the group, e.g. a group identifier (Group ID). The notification may include further information, e.g. service information related to the group, e.g. quotas or thresholds of/for usage monitoring.

S4: The PCRF-A acknowledges the notification.

S5: The PCRF-A checks whether it handles the identified group itself. If yes, the PCRF-A creates and sends relevant PCC rules as usual. If not, then the PCRF-A requests the PCEF to set up a Gx control session to the PCRF-Group and terminates or request the PCEF to terminate the current Gx session between the PCEF and PCRF-A as per the following steps:

S6: The PCRF-A requests the PCEF to establish a Gx control session to the PCRF handling the policy and/or charging control of the group. The same request may be a command to terminate the current Gx control session between the PCRF-A and PCEF, or a request to ask the PCEF to terminate the current Gx control session between the PCRF-A and PCEF with a separate termination command exchange (e.g. as per steps S14 and S15).

S7: The PCEF acknowledges the request, i.e., sends a response.

S8: The PCEF sends a request to the diameter routing agent (DRA) of the realm in order to find the PCRF (PCRF-Group) used by the identified policy and/or charging controlled group. The request may include the information as describe above, e.g., user ID, IP address, group ID, parameters etc.

S9: The DRA finds the correct PCRF.

S10: The DRA routes the request to the correct PCRF (PCRF-Group). The request may include the information as describe above, e.g., user ID, IP address, group ID, parameters etc.

S11: The PCRF-Group may make an SPR/UDR enquiry to get the subscriber's subscription profile. This request may include the user ID, for example.

S12: The SPR/UDR responds to the possible enquiry. The response may include user profile and other parameters, for example.

S13: The PCRF-Group creates relevant PCC rules and possible other parameters and sends them to the PCEF.

S14: The PCEF sends a command to terminate the current Gx control session between the PCRF-A and PCEF, if the termination was not already performed with steps S6 and S7.

S15: The PCRF-A acknowledges the possible termination command.

As an alternative to the above, in step S9, after finding the correct PCRF (i.e., the PCRF-Group), the DRA may request the PCEF to redirect the request to the correct PCRF (PCRF-Group). This request may include the information as describe above, e.g., user ID, IP address, group ID, parameters etc., and may in addition contain information regarding the identity and/or address of the PCRF-Group. That is, this request to redirect would replace step S10. The PCEF will then redirect the request.

In the following, some alternative embodiments are described by which it can be achieved to handle possible simultaneous services:

In order to ensure that the control of ongoing services of the user/UE is not disrupted, the following further control actions may take place:

The PCRF-A may delay sending the PCRF change request (S6 in FIG. 3) or the control session termination command to the PCEF (S14 in FIG. 3) until ongoing service related policy and/or charging control actions or the services themselves have terminated. If in the meantime a service belonging to the group control (e.g. usage monitoring) is started, the PCRF-A performs relevant actions (e.g. monitoring control and report reception) and may include related information/parameters in the request/command sent to the PCEF, which may send the information/parameters further to the PCRF-Group if/when applicable. For example the already reported usage could be information needed by the PCRF-Group.

Alternatively, the PCRF-A may send the request (S6 in FIG. 3)/command (S14 in FIG. 3) after having received the related notice/indication from the SPR/UDR, but the PCEF may delay the starting of the related PCRF change actions until ongoing service related policy and/or charging control actions or the services themselves have terminated. If in the meantime a service belonging to the group control (e.g. usage monitoring) is started, the PCEF takes care of reporting relevant information/parameters to the PCRF-Group (after establishing a Gx control session).

If an ongoing service belongs to the category of the group the user/UE is just joining, the behaviour may be e.g. as follows (depending e.g. by configuration):

The PCRF-A may handle the ongoing session as belonging outside the group, or

The PCEF may start acting and reporting according to the group service rules upon getting the request/command from the PCRF-A, which may include reporting the current status of the service (e.g. monitored usage) to the PCRF-Group, or The PCRF-A may send the status of the ongoing service (e.g. the monitored usage so far) to the PCEF (within the PCRF change request/command) and the PCEF may report the status of the service (e.g. monitored usage) further to the PCRF-Group, allowing the PCRF-Group to include the information retroactively within the handling of the group control.

For implementing the above-described procedures, advantageously new parameters/AVPs could be introduced to indicate the need for changing the PCRF (and the possible transfer of information (e.g. monitoring results) to the new PCRF. This applies in particular when the procedures of the above-described alternative embodiments are applied.

Embodiments of the present application may be applied in the environment regarding usage monitoring groups as described in 3GPP TR 23.858.

It is to be noted that the embodiments and the present invention in general are not limited to the specific examples given above.

For example, the procedures may also be applied to other policy controlled groups than usage monitoring groups or group communication services (GCSEL).

According to the embodiments described above in connection with FIG. 3, a Gx control session is established between the PCEF and the PCRF-Group (and/or a Gxx control session between the BBERF and the PCRF-Group). However, the invention is not limited to a Gx (or Gxx) control session, and any kind of control session can be applied which allows exchange of necessary information, parameters etc. between the network elements involved.

In general, the exemplary embodiments of this invention may be implemented by computer software stored in the memories (memory resources) 13, 23, 33 and executable by the processors (processing resources) 11, 21, 31, or by hardware, or by a combination of software and/or firmware and hardware in the corresponding apparatuses.

According to a further aspect of embodiments of the present invention, an apparatus is provided which comprises
means for providing a connection to a communication network, means for receiving a notification informing that a user equipment is to be included in a policy controlled group, means for checking whether the policy controlled group is controlled by the apparatus, and, means for, in case the policy controlled group is not controlled by the apparatus, causing a transfer of the policy control session for the user equipment to a rules function controlling the policy controlled group.

According to another aspect of embodiments of the present invention, an apparatus is provided which comprises means for providing a connection to a communication network, means for receiving a request from a first rules function including information that a user equipment is to be included in a policy controlled group which is not controlled by the first rules function, and means for causing a determination of a second rules function which controls the policy controlled group.

According to a still further aspect of embodiments of the present invention, an apparatus is provided which comprises means for providing a connection to a communication network, means for receiving a request from an enforcement function including information that a user equipment attached to a first rules function is to be included in a policy controlled group which is not controlled by the first rules function, and means for determining a second rules function which controls the policy controlled group.

It is to be understood that any of the above modifications can be applied singly or in combination to the respective aspects and/or embodiments to which they refer, unless they are explicitly stated as excluding alternatives.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. A policy and charging rules function, comprising:
   a memory comprising computer program code; and
   a processor,
   wherein the memory and the computer program code are configured, with the processor, to cause the apparatus at least to:
   receive, from a group management entity, a notification informing that a user equipment is to be included in a policy controlled group,
   check whether the policy controlled group is controlled by the policy and charging rules function, and
   in case the policy controlled group is not controlled by the policy and charging rules function, cause a transfer of a policy control session for the user equipment to another policy and charging rules function controlling the policy controlled group.

2. The policy and charging rules function according to claim 1, wherein the memory and the computer program code are configured, with the processor, to cause the apparatus at least to:
   cause the transfer of the policy control session by forwarding a request to an enforcement function including information that the user equipment is to be included in the policy controlled group which is not controlled by the policy and charging rules function, and
   performing termination of the policy control session or requesting the enforcement function to terminate the policy control session.

3. The policy and charging rules function according to claim 2, wherein the memory and the computer program code are configured, with the processor, to cause the apparatus at least to delay forwarding of the request or delay performing termination of the policy control session, or requesting the enforcement function to terminate the policy control session, until ongoing service related policy and/or charging control actions or services themselves in connection with the user equipment being terminated.

4. The policy and charging rules function according to claim 1, wherein the memory and the computer program code are configured, with the processor, to cause the apparatus at least to during the causing of the transfer of the policy control session, request the enforcement function to set up another control session with the policy and charging rules function controlling the policy controlled group.

5. The policy and charging rules function according to claim 1, wherein the memory and the computer program code are configured, with the processor, to cause the apparatus at least to if an ongoing service of the user equipment belongs to the group to be joined by the user equipment, to at least one of handle the ongoing session as belonging outside the group, or send the status of the ongoing service to the enforcement function.

6. An apparatus, comprising:
   a memory comprising computer program code; and
   a processor,
   wherein the memory and the computer program code are configured, with the processor, to cause the apparatus at least to:
   receive a request from a first policy and charging rules function including information that a user equipment is to be included in a policy controlled group which is not controlled by the first policy and charging rules function, and
   cause a determination of a second policy and charging rules function which controls the policy controlled group.

7. The apparatus according to claim 6, wherein the memory and the computer program code are configured, with the processor, to cause the apparatus at least to cause the determination of the second policy and charring rules function by forwarding a request to a routing agent.

8. The apparatus according to claim 7, wherein the memory and the computer program code are configured, with the processor, to cause the apparatus at least to receive a request from the routing agent to redirect the request from the first policy and charging rules function to the second policy and charging rules function.

9. The apparatus according to claim 6, wherein the memory and the computer program code are configured, with the processor, to cause the apparatus at least to:
   receive a request from the first and char rules function to set up a control session with the second policy and charging rules function; and
   set up the control session with the second policy and charging ruled function.

10. The apparatus according to claim 7, wherein the memory and the computer program code are configured, with the processor, to cause the apparatus at least to delay sending the request to the routing agent until ongoing service related at least one of policy or charging control actions or the services of the first policy and charging rules function in connection with the user equipment being terminated.

11. The apparatus according to claim 6, wherein the memory and the computer program code are configured, with the processor, to cause the apparatus at least to if an ongoing service of the user equipment belongs to the group to be joined by the user equipment, start acting and reporting according to group service rules upon getting the request or command from the first policy and charging rules function.

12. The apparatus according to claim 11, wherein the memory and the computer program code are configured, with the processor, to cause the apparatus at least to report a current status of the service to the second policy and charging rules function controlling the policy controlled group.

13. The apparatus according to claim 6, wherein the memory and the computer program code are configured, with the processor, to cause the apparatus at least to if an ongoing service of the user equipment belongs to the group to be joined by the user equipment, receive a status of the ongoing service from the first policy and charging rules function, and report the status of the service to the second policy and charging rules function.

14. An apparatus, comprising:
   a memory comprising computer program code; and
   a processor,
   wherein the memory and the computer program code are configured, with the processor, to cause the apparatus at least to:
   receive a request from an enforcement function including information that a user equipment attached to a first policy and charging rules function is to be included in a policy controlled group which is not controlled by the first policy and charging rules function, and
   determine a second policy and charging rules function which controls the policy controlled group.

15. The apparatus according to claim 14, wherein the memory and the computer program code are configured, with the processor, to cause the apparatus at least to:
   forward the request to the second policy and charging rules function, or request the enforcement function to redirect the request to the second policy and charging rules function.

16. A method, comprising:
receiving a notification, in a first policy and charging rules function, informing that a user equipment is to be included in a policy controlled group;
checking whether the policy controlled group is controlled by the first policy and charging rules function; and
in case the policy controlled group is not controlled by the first policy and charging rules function, causing a transfer of a policy control session for the user equipment to a second policy and charging rules function controlling the policy controlled group.

17. The method according to claim 16, wherein causing the transfer of the policy control session comprises:
forwarding a request to an enforcement function including information that the user equipment is to be included in the policy controlled group which is not controlled by the first policy and charging rules function; and
performing termination of the policy control session or requesting the enforcement function to terminate the policy control session.

18. The method according to claim 17, further comprising:
delaying forwarding of the request or delay performing termination of the policy control session or requesting the enforcement function to terminate the policy control session until ongoing service related policy and/or charging control actions or services themselves in connection with the user equipment being terminated.

19. The method according to claim 16, further comprising during causing the transfer of the policy control session, requesting the enforcement function to set up another control session with the second policy and charging rules function.

20. The method according to claim 16, further comprising:
if an ongoing service of the user equipment belongs to the group to be joined by the user equipment, handling the ongoing session as belonging outside the group, or sending the status of the ongoing service to the enforcement function.

21. A method, comprising:
receiving a request from a first policy and charging rules function including information that a user equipment is to be included in a policy controlled group which is not controlled by the first policy and charging rules function; and
causing a determination of a second policy and charging rules function which controls the policy controlled group.

22. The method according to claim 21, further comprising:
causing the determination of the second policy and charging rules function by forwarding a request to a routing agent.

23. The method according to claim 22, further comprising:
receiving a request from the routing agent to redirect the request from the first policy and charging rules function to the second policy and charging rules function.

24. The method according to claim 22, further comprising:
delaying of sending the request to the routing agent until ongoing service related policy or charging control actions or the services of the first policy and charging rules function in connection with the user equipment being terminated.

25. The method according to claim 21, further comprising:
receiving a request from the first policy and charging rules function to set up a control session with the second and char charging rules function; and
setting up the control session with the second policy and charging rules function.

26. The method according to claim 21, further comprising:
if an ongoing service of the user equipment belongs to the group to be joined by the user equipment, starting acting and reporting according to group service rules upon getting the request or command from the first policy and charging rules function.

27. The method according to claim 26, further comprising:
reporting the current status of the service to the second policy and charging rules function controlling the policy controlled group.

28. The method according to claim 21, further comprising:
if an ongoing service of the user equipment belongs to the group to be joined by the user equipment, receiving a status of the ongoing service from the first policy and charging rules function; and
reporting the status of the service to the second policy and charging rules function.

29. A method comprising:
receiving a request from an enforcement function including information that a user equipment attached to a first policy and charging rules function is to be included in a policy controlled group which is not controlled by the first police and charging rules function; and
determining a second policy and charging rules function which controls the policy controlled group.

30. The method according to claim 29, further comprising:
forwarding the request to the second policy and charging rules function, or
requesting the enforcement function to redirect the request to the second policy and charging rules function.

31. A computer program product embodied on a non-transitory computer-readable medium for performing the method according to claim 16.

* * * * *